(12) United States Patent
Rawls-Meehan et al.

(10) Patent No.: US 10,882,265 B2
(45) Date of Patent: Jan. 5, 2021

(54) METHOD FOR FORMING FOAMED SHOE INSOLE AND RELATED ARTICLE

(71) Applicant: ASCION, LLC, Bloomfield Hills, MI (US)

(72) Inventors: Martin B. Rawls-Meehan, Birmingham, MI (US); Hsun-Chen Chang, Taichung (TW)

(73) Assignee: ASCION, LLC, Bloomfield Hills, MI (US)

( * ) Notice: Subject to any disclaimer, the term of this patent is extended or adjusted under 35 U.S.C. 154(b) by 122 days.

(21) Appl. No.: 15/852,429

(22) Filed: Dec. 22, 2017

(65) Prior Publication Data
US 2018/0178472 A1   Jun. 28, 2018

Related U.S. Application Data

(60) Provisional application No. 62/438,635, filed on Dec. 23, 2016.

(51) Int. Cl.
| | | |
|---|---|---|
| *B29D 35/12* | (2010.01) | |
| *A43B 17/14* | (2006.01) | |
| *A43B 13/40* | (2006.01) | |
| *A43B 13/12* | (2006.01) | |
| *B29D 35/14* | (2010.01) | |

(52) U.S. Cl.
CPC ............ *B29D 35/128* (2013.01); *A43B 13/40* (2013.01); *A43B 17/14* (2013.01); *A43B 13/12* (2013.01); *A43B 13/125* (2013.01); *B29D 35/122* (2013.01); *B29D 35/142* (2013.01)

(58) Field of Classification Search
CPC .... B29D 35/128; B29D 35/142; B29D 35/06; B29D 35/10; B29D 35/12; B29D 35/122; A43B 13/12; A43B 13/40; A43B 17/14
See application file for complete search history.

(56) References Cited

U.S. PATENT DOCUMENTS

| | | | | |
|---|---|---|---|---|
| 2012/0090198 A1* | 4/2012 | Stratten | ................ | A43B 1/0045 36/44 |
| 2014/0196308 A1* | 7/2014 | Baratta | ................ | A43B 13/184 36/29 |

* cited by examiner

*Primary Examiner* — Stella K Yi
(74) *Attorney, Agent, or Firm* — Marshall, Gerstein & Borun LLP

(57) ABSTRACT

The disclosure generally relates to a method for forming foamed shoe insoles as well as related shoe and shoe component articles. A foamed polymer having an open-cell foam interior structure and a continuous outer layer or skin can be formed conveniently such as by injection molding. The foamed polymer has a shape corresponding to two opposing shoe insole portions such that it can be cut or otherwise separated into two corresponding complementary foamed shoe insoles. The resulting open-cell foam interior structure and a continuous outer layer of the foamed shoe insoles can provide enhance spring or bounce effect when the insoles are incorporated into a shoe or sole component thereof.

14 Claims, 3 Drawing Sheets

METHOD FOR FORMING FOAMED SHOE INSOLE AND RELATED ARTICLE

CROSS REFERENCE TO RELATED APPLICATION

Priority is claimed to U.S. Provisional Application No. 62/438,635 filed Dec. 23, 2016, which is incorporated herein by reference in its entirety.

STATEMENT OF GOVERNMENT INTEREST

None.

BACKGROUND OF THE DISCLOSURE

Field of the Disclosure

The disclosure generally relates to a method for forming foamed shoe insoles as well as related shoe and shoe component articles. A foamed polymer having an open-cell foam interior structure and a continuous outer layer or skin can be formed conveniently such as by injection molding. The foamed polymer has a shape corresponding to two opposing shoe insole portions such that it can be cut or otherwise separated into two corresponding complementary (e.g., left and right) foamed shoe insoles. The resulting open-cell foam interior structure and a continuous outer layer of the foamed shoe insoles can provide enhanced spring or bounce effect when the insoles are incorporated into a shoe (e.g., a sole component thereof).

Background

Most shoes include an insole and an outsole. Sometimes a midsole is provided as a layer between the insole and outsole. A shoe (e.g., a shoe body thereof) defines an interior cavity formed in an opening for receiving a human foot. Typically, the insole is provided along a floor of the interior cavity, which is in contact with the bottom of the foot during use. The outsole defines an outer portion of the shoe exposed to the surrounding environment. In use, the user wearing a shoe inserts his or her foot into the shoe through the opening, allowing the shoe to substantially form around the foot. The foot generally contacts the insole. The midsole, if one is provided, is sandwiched between the insole and the outsole, which is exposed to the external environment. Some shoes include a removable insole.

Insoles are typically fabricated in a relatively low cost manner providing minimal support and/or minimal additional comfort. Consumers can purchase off the shelf inserts or supports to provide different or added comfort or support for their feet. For example, a consumer may replace the "factory" insole, which is included at the time of purchase of the shoe, with a more supportive arch support, cooling insole fabricated from a more breathable material, or an insole that includes additional padding.

Accordingly, a need exists for a shoe component to provide added comfort, support, and manufacturability in a competitive manner.

SUMMARY

In one aspect, the disclosure relates to a method for forming foamed shoe insoles, the method comprising: (a) forming a foamed polymer in a mold, the foamed polymer comprising (i) an open-cell polymer foam interior body and (ii) a continuous polymer layer (or skin) exterior surface, wherein the mold (e.g., cavity thereof) and foamed polymer have a shape corresponding to two opposing shoe insole portions integrally formed in a face-to-face configuration; (b) removing the foamed polymer from the mold; and (c) separating the foamed polymer between the two opposing shoe insole portions, thereby forming first and second complementary (e.g., left and right) foamed shoe insoles, each foamed shoe insole comprising (i) an open-cell polymer foam interior body and top (or foot-facing) exterior surface, and (ii) a continuous polymer layer (or skin) bottom (or ground-facing) exterior surface and side (or left, front/toe, right, and/or back/heel) exterior surface.

In another aspect, the disclosure relates to a pair of foamed shoe insoles formed according to the foregoing method in any of its various embodiments.

In another aspect, the disclosure relates to a pair of foamed shoe insoles comprising: first and second complementary (e.g., left and right) foamed shoe insoles, each foamed shoe insole comprising (i) an open-cell polymer foam interior body and top (or foot-facing) exterior surface, and (ii) a continuous polymer layer (or skin) bottom (or ground-facing) exterior surface and side (or left, front/toe, right, and/or back/heel) exterior surface; wherein the open-cell polymer foam top exterior surface of the first foamed shoe insole is complementary to the open-cell polymer foam top exterior surface of the second foamed shoe insole.

Various refinements of the foamed shoe insoles and method for forming the same are possible.

In a refinement, forming the foamed polymer comprises injection molding at least one of a foamed and a foaming liquid polymer component into the mold.

In a refinement, the foamed polymer comprises one or more of a foamed polyurethane, a foamed latex, and a foamed polyolefin.

In a refinement, the two opposing shoe insole portions of the foamed polymer correspond to a left foot shoe insole portion and a right foot shoe insole portion, wherein a top side (or foot-contact side) of the left foot shoe insole portion is at a surface corresponding to a top side (or foot-contact side) of the right foot shoe insole portion.

In a refinement, separating the foamed polymer between the two opposing shoe insole portions comprises cutting along a midline (or plane) between the two opposing shoe insole portions.

In a refinement, the two opposing shoe insole portions and the first and second complementary foamed shoe insoles correspond to at least one of a toe section, a midfoot section, and a heel section of a human foot.

In a refinement, the open-cell polymer foam top exterior surface of the first foamed shoe insole is complementary to the open-cell polymer foam top exterior surface of the second foamed shoe insole.

In a refinement, the method further comprises: (d) assembling each foamed shoe insole with one or more other shoe components selected from the group consisting of a shoe midsole, a shoe outsole, a shoe body, and combinations thereof. In a further refinement, the method comprises assembling each foamed shoe insole with an outsole and optionally a midsole therebetween (e.g., forming assembled left and right soles).

In another aspect, the disclosure relates to a pair of shoes comprising: (a) a first shoe comprising: a first sole comprising the first foamed shoe insole according to any of the variously disclosed embodiments, a first outsole, and optionally a first midsole therebetween; and a first shoe body attached to the first sole and defining a first interior cavity and opening for receiving a human foot, wherein the open-cell polymer foam top exterior surface of the first foamed shoe insole is oriented to face the first interior cavity; and (b) a second shoe comprising: a second sole comprising the second foamed shoe insole according to any of the variously disclosed embodiments, a second outsole, and optionally a second midsole therebetween; and a second shoe body attached to the second sole and defining a second interior cavity and opening for receiving a human foot, wherein the open-cell polymer foam top exterior surface of the second foamed shoe insole is oriented to face the second interior cavity.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

While the disclosed articles and methods and are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

Figure 1:
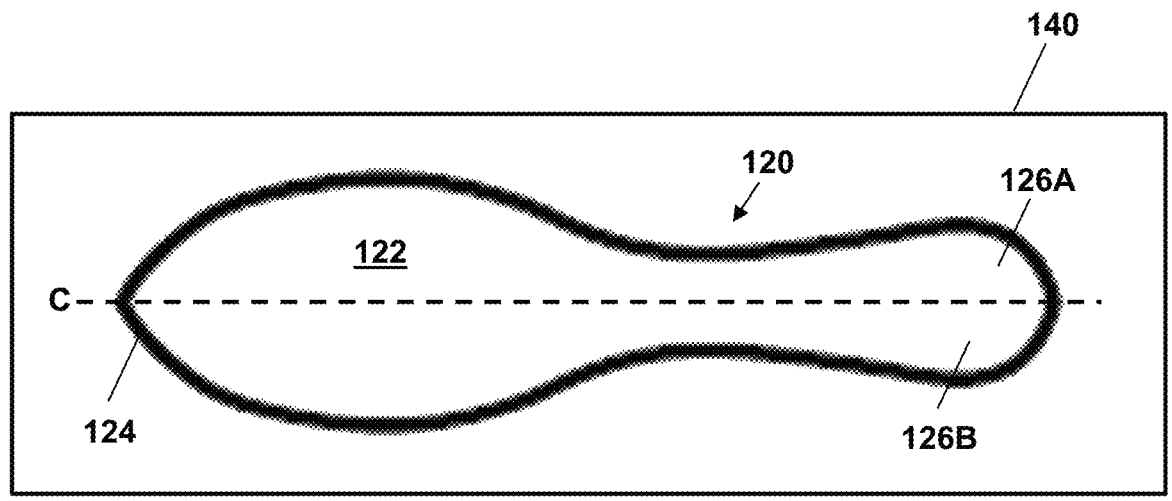
FIG. 1 is a side view of a foamed polymer body corresponding to two opposing shoe insole portions integrally formed in a face-to-face configuration according to the disclosure.
Figure 2:
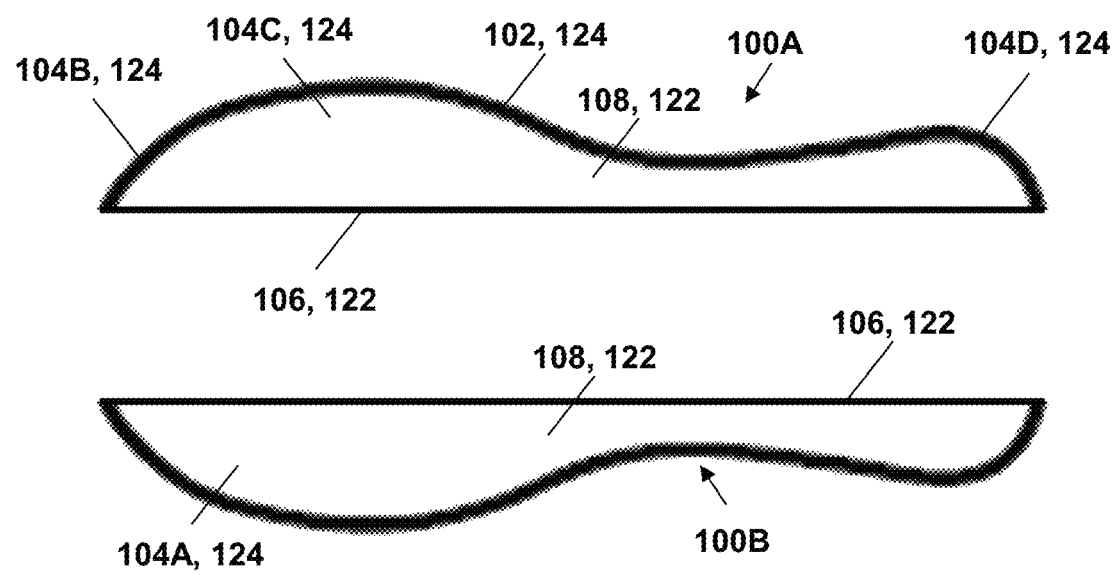
FIG. 2 is a side view of the foamed polymer body of FIG. 1 after having been cut into two separate foamed shoe insoles.
Figure 3:
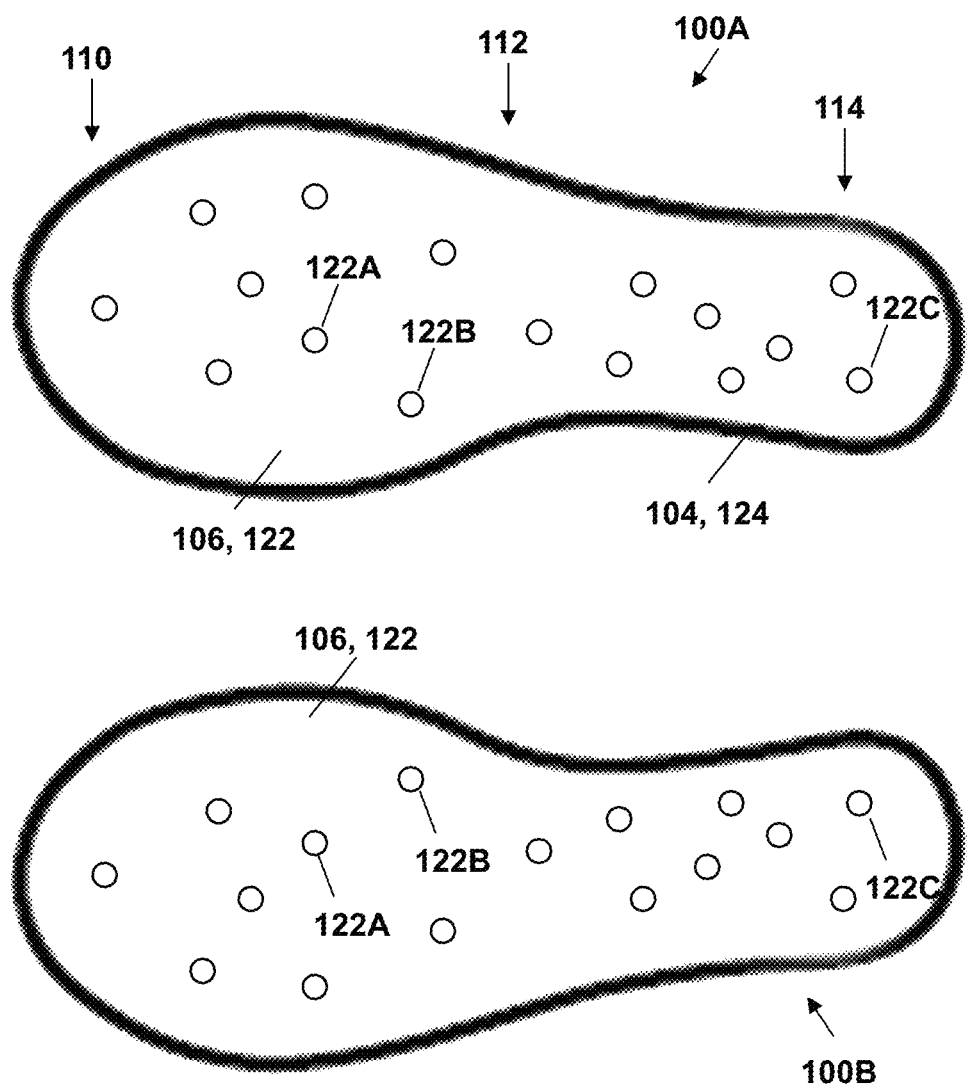
FIG. 3 is a top view of the foamed polymer body of FIG. 1 after having been cut into two separate foamed shoe insoles.

The disclosure generally relates to a shoe insole (e.g., as an insert or as an integral portion of a formed shoe) as well as methods of making the same. The insole is formed from an open-cell foamed polymer such as polyurethane or latex. A foamed polymer is formed by injection-molding a polymer melt including a blowing agent into a mold that corresponds to two opposing insoles integrally formed in a face-to-face configuration (FIG. 1). For example, the top side (or foot-contact side) of the left foot insole is at a surface corresponding to the top side (or foot-contact side) of the right foot insole. The interior body of the two opposing insoles is formed from an open-cell foamed polymer. The outer surface of the two opposing insoles has a continuous polymer layer (or "skin") which corresponds to the bottom and side surfaces of both insoles. The injection molded insole is removed from the mold and the sliced/cut along the midline and separated into two opposing insoles (FIGS. 2 and 3). Once separated, each individual insole has the continuous polymer layer or skin on its bottom and side surfaces, an open-cell foamed polymer interior, and an open-cell foamed polymer top surface (or foot-contact surface). The concept is that the exposed open-cell foamed polymer top surface allows air to flow within the insole body during compression, but the air is retained within the insole by the side and bottom continuous polymer layers. This structure with an exposed open-cell foamed polymer top surface and sealed side/bottom surfaces can provide an enhanced spring or bounce effect when the insole is compressed by a user's foot during normal use of shoes including the disclosed insole.

FIGS. 1 to 4 illustrate foamed shoe insoles 100 according to the disclosure as well as methods for making the same and related articles (e.g., a shoe 10 and/or a shoe sole 20).

FIG. 1 illustrates a first step in a method for forming foamed shoe insoles 100 according to the disclosure. A foamed polymer 120 is formed in a mold 140 (e.g., a mold cavity thereof). The foamed polymer 120 has an open-cell polymer foam 122 as part (or all) of its interior body and a continuous polymer layer (or skin) 124 as its exterior surface. An open-cell polymeric foam is generally characterized by polymeric cell walls defining a plurality of interconnected cells or voids through which gas and/or liquids can be transported (e.g., in contrast to closed-cell foams generally characterized by isolated cells or voids that do not generally permit gas and/or liquid transport through the foam). Suitably, the continuous polymer layer 124 covers all or substantially all of the exterior surface of the foamed polymer 120 (e.g., providing a completely air-tight barrier between the external environment and the interior body having the open-cell polymer foam 122 structure). The mold 140 (e.g., the mold cavity thereof) and the foamed polymer 120 have a shape corresponding to two opposing shoe insole portions 126A, 126B that are integrally formed in a face-to-face configuration.

The foamed polymer 120 can be formed by any suitable method known in the art, for example injection molding. At least one of a foamed liquid polymer component and a foaming liquid polymer component can be injected into the mold 140, whereupon it can react and/or cool to form the foamed polymer 120. For example, the liquid polymer component can be a polymer melt, such as a heated thermoplastic and/or elastomeric polymer (e.g., an already-formed polymer) in a melted/liquid state, which then cools in the mold 140 to form a solid foamed polymer 120. Similarly, the liquid polymer component can include reactive liquid monomer and/or prepolymer components that react in the mold to form solid foamed polymer 120 (e.g., a polyisocyanate and a polyol to form a polyurethane). The liquid polymer component can be foamed at and/or during the point of injection, such as by mechanical foaming (e.g., injection of air or other gas bubbles into the liquid polymer component as it is injected into the mold), and/or by inclusion of a physical and/or chemical blowing agent along with the liquid polymer component(s). Inclusion of a physical and/or chemical blowing agent with the liquid polymer component(s) can create a foamed liquid polymer component (i.e., already containing foam/gas bubble regions during injection) and/or a foaming liquid polymer component (i.e., which develops foam/gas bubble regions after injection while sitting in mold). Physical and chemical blowing agents are known in the art, for example including water (e.g., which can react with isocyanate groups in urethane precursors or otherwise to form carbon dioxide gas), bicarbonates (e.g., sodium bicarbonate), etc.

The foamed polymer 120 is not particularly limited and can include any suitable foam material to provide cushioning and/or spring properties to the insole, for example including elastomeric polymeric foams. Examples of suitable foamed polymers 120 include foamed polyurethane, foamed latex, and foamed polyolefin, among others. A polyurethane is a particularly suitable type of elastomeric polymeric foam. A polyurethane foam can be prepared by mixing and stirring a (liquid) mixture including a polyisocyanate and a polyol, optionally further including a catalyst, a blowing agent, a foam stabilizer (a surfactant), and/or other optional auxiliaries, and thereby allowing the components to react and polymerize, creating the polymer 120 with the interior open-cell foamed structure.

As shown in FIGS. 2 and 3, the foamed polymer 120 is removed from the mold 140, and the foamed polymer 120 is then separated between the two opposing shoe insole portions 126A, 126B. The separation step forms first and second complementary foamed shoe insoles 100A, 100B (e.g., left-foot and right-foot insoles). Each foamed shoe insole 100A, 100B includes an open-cell polymer foam 122 interior body 108 and top (or foot-facing) exterior surface 106, and a continuous polymer layer (or skin) 124 bottom (or ground-facing) exterior surface 102 and side exterior surface 104 (e.g., (or left 104A, front/toe 104B, right 104C, and/or back/heel 104D side exterior surfaces). The two opposing shoe insole portions 126A, 126B of the foamed polymer 120 correspond to a left foot shoe insole portion 100B and a right foot shoe insole portion 100A, where a top side 106 (or foot-contact side) of the left foot shoe insole portion 100B is at a surface corresponding to a top side 106 (or foot-contact side) of the right foot shoe insole portion 100A. Separation of the foamed polymer 120 between the two opposing shoe insole portions 126A, 126B can be performed by any suitable means known in the art, for example by cutting or slicing (e.g., with a blade or other cutting means for separation) along a centerline or midline C (or other center surface or plane) between the two opposing shoe insole portions 126A, 126B.

As shown in FIG. 3, the foamed shoe insoles 100A, 100B can correspond to an entire foot, including toe 110, midfoot 112, and heel 114 sections. More generally, the two opposing shoe insole portions 126A, 126B and the first and second complementary foamed shoe insoles 100A, 100B correspond to (e.g., are shaped for) at least one of the toe section 110, the midfoot section 112, and the heel section 114 of a human foot. For example, they can correspond to only a portion a foot, such as the toe 110, midfoot 112, or heel 114 section alone, the toe 110/midfoot 112 sections, or the midfoot 112/heel 114 sections.

In some embodiments, the method further includes assembling each foamed shoe insole 100A, 100B with one or more other shoe components, for example one or more of a shoe midsole 200, a shoe outsole 300, and a shoe body 30. The components can be glued, stitched, or otherwise fastened together to form a completed shoe or shoe component as generally known in the art. In an embodiment, each foamed shoe insole 100A, 100B is assembled with an outsole 300 and optionally a midsole 200 therebetween, thereby forming assembled left and right soles 20, which can be subsequently assembled with corresponding left and right shoe bodies 30 to form left and right shoes 10.

For a given pair of foamed shoe insoles 100A, 100B formed according to the disclosed method, the pair can be characterized such that the open-cell polymer foam 122 top exterior surface 106 of the first foamed shoe insole 100A is complementary to the open-cell polymer foam 122 top exterior surface 106 of the second foamed shoe insole 100B. For example, two top surfaces 106 of corresponding insoles 100A, 100B can generally be mirror images of each other, such as a result of having been cut/sliced along a surface through the open-cell polymer foam 122 interior body of a molded foamed polymer 120. Interior polymer walls and corresponding void/cell areas of the open-cell polymer foam 122 from each shoe insole top surface 106 would be substantially continuous if placed face to face. For example, random foam structural elements on one top surface 106 have complementary/mirror image random foam structural elements on the other top surface 106. This is illustrated in FIG. 3 with illustrative foam structural elements 122A, 122B, 122C (e.g., walls, cells, etc.) that are substantially identical and located at complementary (reflection) locations on the top surface 106 of each insole 100A, 100B.

Figure 4:
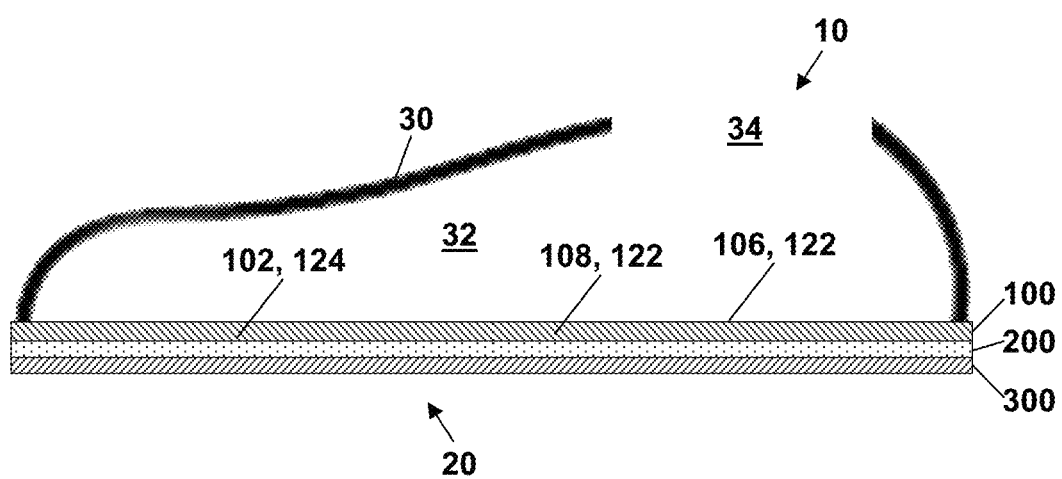
FIG. 4 is a side view of a shoe incorporating the foamed shoe insole according to the disclosure.

FIG. 4 illustrates a shoe 10 which incorporates a foamed shoe insole 100 according to the disclosure. The shoe 10 is illustrative of a single shoe in a pair of shoes, where each shoe in the pair can have one of the two complementary foamed shoe insoles 100A, 100B. The shoe 10 includes a sole 20, which includes the foamed shoe insole 100 according to the disclosure, and outsole 300, and optionally a first midsole therebetween (e.g., where all components are glued or otherwise fastened together). A shoe body 30 is attached to the sole 10 and defines an interior cavity 32 and opening 34 for receiving a human foot, and the open-cell polymer foam 122 top exterior surface 106 of the foamed shoe insole 100 is oriented to face the interior cavity 32. As described above, the exposed open-cell foamed polymer 122 top surface 106 allows air to flow within the insole body 100 during compression, but the air is retained within the insole 100 by the side and bottom continuous polymer layers 124. This structure with an exposed open-cell foamed polymer 122 top surface 106 and sealed side/bottom surfaces 102, 104 can provide an enhanced spring or bounce effect when the insole 100 is compressed by a user's foot during normal use of shoes 10 including the disclosed insole 100.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the articles, compositions, processes, or apparatus are described as including components, steps, or materials, it is contemplated that the articles, compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS LIST 10 shoe
20 sole
30 shoe body 32 shoe interior cavity for receiving a human foot
34 shoe opening for receiving a human foot
100 foamed shoe insole (100A, B: first and second complementary foamed shoe insoles)
102 foamed shoe insole bottom surface
104 foamed shoe insole side surface (104A, B, C, D: left, front/toe, right, and/or back/heel surfaces)
106 foamed shoe insole top surface
108 foamed shoe insole interior body
110 foamed shoe insole toe section
112 foamed shoe insole midfoot section
114 foamed shoe insole heel section
120 foamed polymer
122 open-cell polymer foam (122A, B, C: complementary/mirror image foam structures such as walls, cells, etc.)
124 continuous polymer layer
126A, 126B two (first and second) opposing shoe insole portions
C centerline/midline between two opposing shoe insole portions
140 mold
200 midsole
300 outsole

What is claimed is:

1. A method for forming foamed shoe insoles, the method comprising:
   (a) forming a foamed polymer in a mold, the foamed polymer comprising (i) an open-cell polymer foam interior body and (ii) a continuous polymer layer exterior surface,
      wherein the mold and foamed polymer have a shape corresponding to two opposing shoe insole portions integrally formed in a face-to-face configuration;
   (b) removing the foamed polymer from the mold; and
   (c) separating the foamed polymer between the two opposing shoe insole portions, thereby forming first and second complementary foamed shoe insoles, each foamed shoe insole comprising (i) an open-cell polymer foam interior body and top exterior surface, and (ii) a continuous polymer layer bottom exterior surface and side exterior surface.

2. The method of claim 1, wherein forming the foamed polymer comprises injection molding at least one of a foamed and a foaming liquid polymer component into the mold.

3. The method of claim 1, wherein the foamed polymer comprises one or more of a foamed polyurethane, a foamed latex, and a foamed polyolefin.

4. The method of claim 1, wherein the two opposing shoe insole portions of the foamed polymer correspond to a left foot shoe insole portion and a right foot shoe insole portion, wherein a top side of the left foot shoe insole portion is at a surface corresponding to a top side of the right foot shoe insole portion.

5. The method of claim 1, wherein separating the foamed polymer between the two opposing shoe insole portions comprises cutting along a midline between the two opposing shoe insole portions.

6. The method of claim 1, wherein the two opposing shoe insole portions and the first and second complementary foamed shoe insoles correspond to at least one of a toe section, a midfoot section, and a heel section of a human foot.

7. The method of claim 1, wherein the open-cell polymer foam top exterior surface of the first foamed shoe insole is complementary to the open-cell polymer foam top exterior surface of the second foamed shoe insole.

8. The method of claim 1, further comprising:
   (d) assembling each foamed shoe insole with one or more other shoe components selected from the group consisting of a shoe midsole, a shoe outsole, a shoe body, and combinations thereof.

9. The method of claim 8, comprising assembling each foamed shoe insole with an outsole and optionally a midsole therebetween.

10. A method for forming foamed shoe insoles, the method comprising:
    (a) forming a foamed polymer in a mold, the foamed polymer comprising (i) an open-cell polymer foam interior body and (ii) a continuous polymer layer exterior surface,
       wherein:
          the mold and foamed polymer have a shape corresponding to two opposing shoe insole portions integrally formed in a face-to-face configuration,
          the two opposing shoe insole portions of the foamed polymer correspond to a left foot shoe insole portion and a right foot shoe insole portion in which a top side of the left foot shoe insole portion is at a surface corresponding to a top side of the right foot shoe insole portion, and
          forming the foamed polymer comprises injection molding at least one of a foamed and a foaming liquid polymer component into the mold;
    (b) removing the foamed polymer from the mold; and
    (c) separating the foamed polymer between the two opposing shoe insole portions, thereby forming first and second complementary foamed shoe insoles, each foamed shoe insole comprising (i) an open-cell polymer foam interior body and top exterior surface, and (ii) a continuous polymer layer bottom exterior surface and side exterior surface,
       wherein the open-cell polymer foam top exterior surface of the first foamed shoe insole is complementary to the open-cell polymer foam top exterior surface of the second foamed shoe insole.

11. The method of claim 10, wherein the two opposing shoe insole portions and the first and second complementary foamed shoe insoles each correspond to a toe section, a midfoot section, and a heel section of a human foot.

12. The method of claim 11, wherein separating the foamed polymer between the two opposing shoe insole portions comprises cutting along a midline between the two opposing shoe insole portions.

13. The method of claim 12, further comprising:
    (d) assembling each foamed shoe insole with one or more other shoe components selected from the group consisting of a shoe midsole, a shoe outsole, a shoe body, and combinations thereof.

14. The method of claim 13, wherein the foamed polymer comprises one or more of a foamed polyurethane, a foamed latex, and a foamed polyolefin.

* * * * *